(12) United States Patent
Harano et al.

(10) Patent No.: US 10,537,938 B2
(45) Date of Patent: *Jan. 21, 2020

(54) MAGNETIC CORE AND METHOD FOR MANUFACTURING SAME

(71) Applicant: NTN CORPORATION, Osaka (JP)

(72) Inventors: Takuji Harano, Aichi (JP); Hiroyuki Noda, Mie (JP)

(73) Assignee: NTN CORPORATION, Osaka (JP)

( * ) Notice: Subject to any disclaimer, the term of this patent is extended or adjusted under 35 U.S.C. 154(b) by 206 days.

This patent is subject to a terminal disclaimer.

(21) Appl. No.: 15/512,823

(22) PCT Filed: Sep. 17, 2015

(86) PCT No.: PCT/JP2015/076582
§ 371 (c)(1),
(2) Date: Mar. 20, 2017

(87) PCT Pub. No.: WO2016/043295
PCT Pub. Date: Mar. 24, 2016

(65) Prior Publication Data
US 2017/0297096 A1    Oct. 19, 2017

(30) Foreign Application Priority Data

Sep. 18, 2014 (JP) ................................. 2014-189903

(51) Int. Cl.
*B22F 1/00* (2006.01)
*H01F 1/24* (2006.01)
(Continued)

(52) U.S. Cl.
CPC .............. *B22F 1/007* (2013.01); *B32B 27/26* (2013.01); *B32B 27/38* (2013.01); *C08K 9/02* (2013.01);
(Continued)

(58) Field of Classification Search
None
See application file for complete search history.

(56) References Cited

U.S. PATENT DOCUMENTS 9,443,652 B2 * 9/2016 Yoon ................... H01F 1/14741
9,620,270 B2 * 4/2017 Uemoto .................... H01F 3/10
(Continued)

FOREIGN PATENT DOCUMENTS

CN    1774773 A     5/2006
CN    102834208 A    12/2012
(Continued)

OTHER PUBLICATIONS

Supplementary European Search Report dated Apr. 20, 2018.
(Continued)

*Primary Examiner* — Kevin M Bernatz
(74) *Attorney, Agent, or Firm* — Hedman & Costigan, P.C.; James V. Costigan; Kathleen A. Costigan (57) ABSTRACT

The present invention provides a magnetic core having insulating properties, and a method for manufacturing the magnetic core. Provided is a magnetic core manufactured by compression molding and subsequent thermal curing of an iron-based soft magnetic powder having a resin coating formed on particle surfaces thereof. The iron-based soft magnetic powder is one in which the particle surfaces have been coated with an inorganic insulator; the resin coating is an uncured resin coating formed by dry blending the powder with a thermosetting resin at a temperature equal to or greater than the softening point of the thermosetting resin and lower than the thermal curing initiation temperature of the resin; the compression molding is carried out by using a mold to produce a compression molded body; and the
(Continued)

thermal curing is carried out at a temperature equal to or greater than the thermal curing initiation temperature of the thermosetting resin.

6 Claims, 4 Drawing Sheets (51) Int. Cl.
*B32B 27/26* (2006.01)
*B32B 27/38* (2006.01)
*C08K 9/02* (2006.01)
*H01F 1/33* (2006.01)
*H01F 41/02* (2006.01)
*H01F 3/08* (2006.01)

(52) U.S. Cl.
CPC ............... *H01F 1/24* (2013.01); *H01F 1/33* (2013.01); *H01F 41/0246* (2013.01); *H01F 3/08* (2013.01)

(56) References Cited

U.S. PATENT DOCUMENTS

| | | | | |
|---|---|---|---|---|
| 10,204,725 B2* | 2/2019 | Uemoto | .................... | H01F 3/10 |
| 2005/0030140 A1* | 2/2005 | Dahlgren | ............. | H01F 27/255 336/5 |
| 2006/0165985 A1* | 7/2006 | Matsukawa | ............... | H01F 1/26 428/384 |
| 2008/0003126 A1* | 1/2008 | Watanabe | ................. | B22F 1/02 419/35 |
| 2008/0044679 A1* | 2/2008 | Maeda | ...................... | B22F 1/02 428/546 |
| 2008/0152897 A1* | 6/2008 | Maeda | ................. | B22F 1/0059 428/323 |
| 2010/0193726 A1* | 8/2010 | Maeda | ................. | B22F 1/0062 252/62.54 |
| 2010/0194516 A1* | 8/2010 | Sato | .......................... | H01F 1/24 336/221 |
| 2010/0239879 A1* | 9/2010 | Kawano | .................... | B22F 1/02 428/570 |
| 2011/0217543 A1* | 9/2011 | Suetsuna | .................. | B32B 5/16 428/323 |
| 2011/0233811 A1* | 9/2011 | Blettner | ................. | B29C 43/003 264/104 |
| 2012/0119134 A1* | 5/2012 | Muramatsu | ............... | B22F 1/02 252/62.55 |
| 2012/0286909 A1* | 11/2012 | Ohwaki | .................... | H01F 1/24 335/297 |
| 2013/0056674 A1 | 3/2013 | Inagaki | | |
| 2013/0057371 A1* | 3/2013 | Shimoyama | .......... | B22F 1/0062 335/297 |
| 2015/0270050 A1 | 9/2015 | Uemoto | | |
| 2016/0125987 A1* | 5/2016 | Moon | ..................... | C22C 45/02 252/62.54 |
| 2016/0276078 A1* | 9/2016 | Pagano | .................... | H01F 1/26 |
| 2017/0040094 A1* | 2/2017 | Kako | ........................ | B22F 1/02 |
| 2017/0098499 A1* | 4/2017 | Mori | ........................ | C22C 33/00 |
| 2017/0330661 A1* | 11/2017 | Terakawa | .................. | B22F 9/22 |

FOREIGN PATENT DOCUMENTS

| | | |
|---|---|---|
| CN | 102917818 A | 2/2013 |
| CN | 104685583 A | 6/2015 |
| EP | 1150312 A2 | 10/2001 |
| EP | 2905791 A1 | 8/2015 |
| EP | 3131100 A1 | 2/2017 |
| JP | 2002-246219 A | 8/2002 |
| JP | 2002-305108 A | 10/2002 |
| JP | 2008-270539 A | 11/2008 |
| JP | 2011-233860 A | 11/2011 |
| JP | 2012-124502 A | 6/2012 |
| JP | 2014-072482 A | 4/2014 |
| JP | 5565595 B2 | 8/2014 |
| WO | 2011/126119 A1 | 10/2011 |
| WO | 2011/126120 A1 | 10/2011 |
| WO | 2014/054514 A1 | 4/2014 |

OTHER PUBLICATIONS

English Abstract for CN 1774773 A dated May 17, 2006.
English Abstract for JP 2002-246219 A dated Aug. 30, 2002.
International Search Report for PCT/JP2015/076582 dated Dec. 8, 2015.
English Abstract for JP 2002-305108 A dated Oct. 18, 2002.
English Abstract for JP 2008-270539 A dated Nov. 6, 2008.

* cited by examiner

MAGNETIC CORE AND METHOD FOR MANUFACTURING SAME

TECHNICAL FIELD

The present invention relates to a magnetic core and a method for manufacturing the magnetic core, more particularly to an iron-based soft magnetic core to be mounted on a heating coil portion of an induction hardening apparatus and a method for manufacturing same.

BACKGROUND ART

A magnetic core has the effect of accelerating induction heating by concentrating magnetic force lines on a workpiece and increasing the power of a coil in the case where the magnetic core is mounted on a rear surface of the coil, and has the effect of preventing a part requiring no hardening operation from being heated by shielding the part against magnetic force lines in the case where the magnetic core is mounted on a front surface of the coil. Thus, a magnetic core is a component part indispensable for a heating coil of an induction hardening apparatus.

For example, if a workpiece to be subjected to induction hardening has a complicated shape which necessitates adjustment of hardening depth, it is possible to change the state of induction heating and control the hardening depth of the workpiece by altering the shape, size, quantity, direction, and position of the core to be mounted on a heating coil. Materials of such cores should have some magnetic properties such as (1) satisfactory frequency characteristics, namely, small changes of inductance at varied frequencies, (2) a high saturation magnetic flux density, (3) a high relative permeability, and (4) a low iron loss.

Because target workpieces have various shapes, most core parts are produced in a high-mix low-volume production manner, including one-by-one cutting operations in many cases. Accordingly, there is a need for core materials having high strength and good cutting workability.

Magnetic cores manufactured by using powder-metallurgy techniques, which can reduce raw material losses and have a high mass-production capacity, are commonly used as magnetic cores for heating coils of induction hardening apparatuses. Examples of magnetic cores for induction hardening coils include a product made of magnetic powder particles consolidated with a fluororesin, and a product made of sendust particles consolidated with a phenol resin. However, these magnetic cores have been disadvantageous in that they have relatively poor material strength, and may be cracked when their thin sections are subjected to cutting operations, or broken upon mounting on coils.

In an attempt to solve the above-mentioned problems, it has been proposed by the present applicant to produce a magnetic core by compression molding and thereafter thermally hardening an iron-based soft magnetic powder having resin films formed on surfaces of particles thereof (Patent Document 1). This magnetic core is one which exhibits high economic efficiency, good magnetic properties and high material strength as well as abroad utility which allows the core to be mounted on a heating coil portion of an induction hardening apparatus.

PRIOR ART DOCUMENT

Patent Document

Patent Document 1: Japanese Patent Application Laid-Open Publication No. 2014-72482

SUMMARY OF THE INVENTION

Problems to be Solved by the Invention

Some shapes of heating coils and some mounting ways of magnetic cores require that magnetic cores for heating coil portions of induction hardening apparatuses have a volume resistivity of about $10^5$ $\Omega \cdot$/cm as an electrical insulating property.

However, in spite of its broad utility, the magnetic core disclosed in Patent Document 1 has insufficient electrical insulating properties; thus, some use applications may cause an electric short or heat generation through the magnetic core, which significantly deteriorate the durability of the magnetic core. Therefore, the magnetic core of Patent Document 1 has been disadvantageous in that there is a difficulty of expanding its use applications to those where insulating properties are expected.

The present invention is directed to overcoming the above-described problem. It is an object of the present invention to provide a magnetic core having insulating properties, particularly a soft magnetic core which can be mounted, for example, on a heating coil portion of an induction hardening apparatus while maintaining advantages of the magnetic core disclosed in Patent Document 1, and a method for manufacturing such a magnetic core.

Means for Solving the Problems

The magnetic core of the present invention is manufactured by compression molding and subsequent thermal curing of an iron-based soft magnetic powder having a resin coating formed on particle surfaces thereof. This magnetic core is characterized in that: the iron-based soft magnetic powder is one in which particle surfaces have been coated with an inorganic insulator; the resin coating is an uncured resin coating formed by dry blending the powder with a thermosetting resin at a temperature equal to or greater than the softening point of the thermosetting resin and lower than the thermal curing initiation temperature of the resin; the compression molding is carried out by using a mold to produce a compression molded body; and the thermal curing is carried out at a temperature equal to or greater than the thermal curing initiation temperature of the thermosetting resin.

The particles of the iron-based soft magnetic powder, the surfaces thereof having been coated with an inorganic insulator, pass through a sieve having a mesh opening size of 106 μm, but do not pass through a sieve having a mesh opening size of 25 μm. The resin coating formed on the particle surfaces of the iron-based soft magnetic powder is an epoxy resin containing a latent curing agent. Particularly, the latent curing agent is dicyandiamide. The epoxy resin containing the latent curing agent has a softening point of 100° C. to 120° C. The iron-based soft magnetic powder is contained in an amount of 95 to 99% by mass, and the epoxy resin containing the latent curing agent is contained in an amount of 1 to 5% by mass, based on the total amount of the iron-based soft magnetic powder and the epoxy resin containing the latent curing agent.

The magnetic core of the present invention is adapted for use with an induction hardening coil.

The present invention provides a method for manufacturing the magnetic core, the method including: a blending step of dry blending the iron-based soft magnetic powder, the particle surfaces thereof having been coated with an inorganic insulator, with the epoxy resin containing the latent curing agent, at a temperature equal to or greater than the softening point of the epoxy resin and lower than the thermal curing initiation temperature of the resin; a pulverizing step of pulverizing an agglomerated cake produced in the blending step, at room temperature, to obtain a composite magnetic powder; a compression molding step of molding the composite magnetic powder into a compression molded body by using a mold; and a curing step of thermally curing the compression molded body at a temperature equal to or greater than the thermal curing initiation temperature of the epoxy resin. Particularly, the compression molding step is carried out under a molding pressure of 98 to 294 MPa. The curing step is carried out at a curing temperature of 170° C. to 190° C. in an inert gas atmosphere.

Effect of the Invention

The magnetic core of the present invention exhibits improved electrical insulating properties represented by a volume resistivity of $10^5$ Ω·/cm, as compared to the magnetic core disclosed in Patent Document 1.

MODE FOR CARRYING OUT THE INVENTION

An outer joint member of a constant velocity universal joint is usually produced from a columnar material through a forging process such as cold forging, followed by induction hardening. In many cases, the induction hardening is performed with a magnetic core arranged at the front side or the backside of a high-frequency coil in order to adjust the degree of hardening in the induction hardening treatment of the outer or inner surface of a cup section and a shaft section of the outer joint member.

Figure 1:
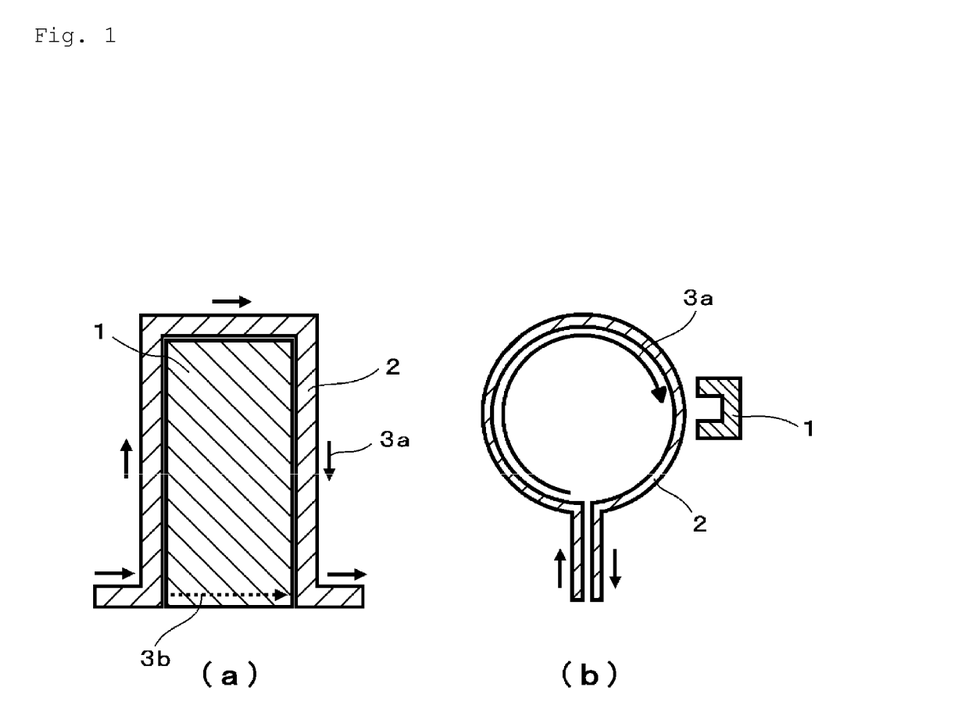
FIGS. 1(a) and 1(b) show positional relationships between the magnetic core and a high-frequency coil.

Positional relationships between the magnetic core and the high-frequency coil are shown in FIGS. 1(a) and 1(b). FIG. 1(a) shows a usage pattern where the magnetic core is fitted in the frame of a circular or rectangular coil. FIG. 1(b) shows another usage pattern where the magnetic core is placed at one end of a coil.

As shown in FIGS. 1(a) and 1(b), a coil 2 is formed of a copper pipe or plate of low electrical resistance, in which a magnetic core 1 for controlling magnetic flux is placed in order to improve the heating efficiency or adjust the region to be heated. This magnetic core 1 can concentrate the magnetic flux in a workpiece, the magnetic flux being generated by the flow of a coil current 3a, or can shield the workpiece against the magnetic flux, so as to change the state of induction heating. In the case of FIG. 1(a), if magnetic core 1 is one having a low dielectric strength, a leak current 3b may flow through magnetic core 1, which then may suffer a breakdown, erosion, a short circuit or other problems, leading to a significant decrease in the durability of magnetic core 1. In the case of FIG. 1(b), in contrast, such an electric short circuit would not arise through magnetic core 1, and therefore it is not always necessary for magnetic core 1 to have a high dielectric strength.

It was conceived that a magnetic core having an increased volume resistivity could be obtained by coating the particle surfaces of a magnetic powder, a raw material of the magnetic core, with an insulating material so as to improve the dielectric strength. Then, it was attempted to coat the particle surfaces with an organic insulating material or an inorganic material singly, but the volume resistivity of the obtained magnetic core was not significantly improved. However, by making a multilayer including an organic insulating material and an inorganic material, the volume resistivity was increased by a factor of hundred thousand or more as compared to what it would be with a single layer of either one of the materials. The present invention is based on this finding.

Figure 2:
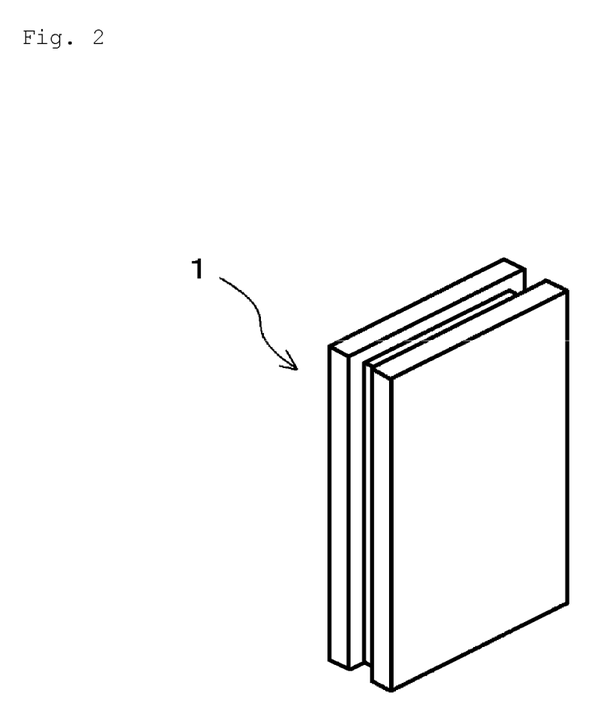
FIG. 2 is a perspective view of the magnetic core.
Figure 3:
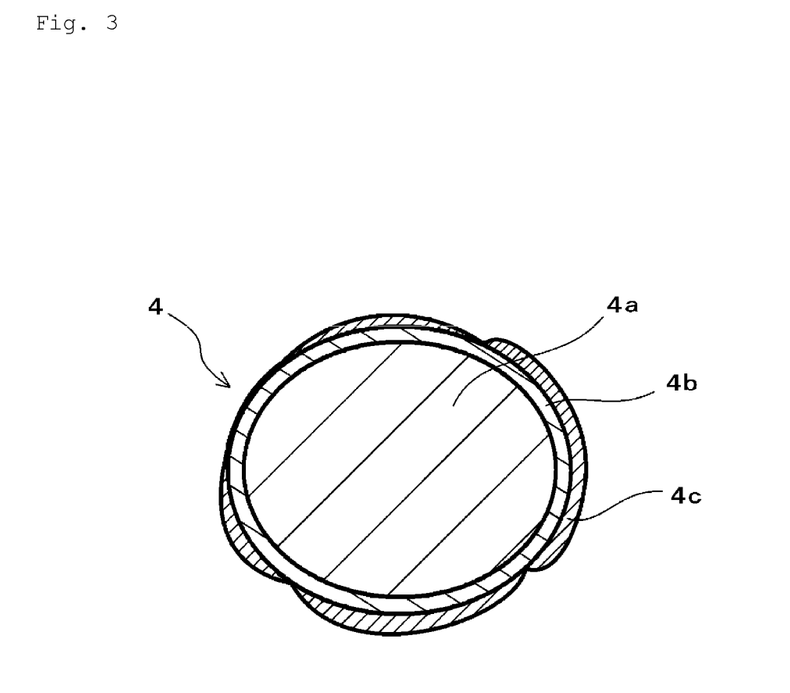
FIG. 3 is a cross sectional view of a particle of the composite magnetic powder.

FIGS. 2 and 3 show an example of a perspective view of the magnetic core and a cross section of a particle of the composite magnetic powder used as a raw material of the magnetic core, respectively. Magnetic core 1 can be obtained by subjecting a composite magnetic powder particle 4 to compression molding and thermal curing. Composite magnetic powder particle 4 is made by coating the surface of an iron-based soft magnetic powder particle 4a with an inorganic insulating coating 4b, the surface of inorganic insulating coating 4b being coated with an uncured resin coating 4c. Magnetic core 1 can be manufactured by compression molding of composite magnetic powder particle 4 and subsequent thermal curing of resin coating 4c. Thereafter, magnetic core 1 may be subjected to finishing processes such as cutting operation, barrel finishing and rustproofing as needed. If combined with a high-frequency coil, the shape or other properties of the magnetic core can be appropriately varied depending on the shape, size or place of the high-frequency coil to be employed. Magnetic core 1 shown in FIG. 2 is an example of the magnetic core adapted to be fitted in the frame of a circular or rectangular coil.

Examples of the iron-based soft magnetic powder which can be employed in the present invention include powders of pure iron, an iron-silicon alloy, an iron-nitrogen alloy, an iron-nickel alloy, an iron-carbon alloy, an iron-boron alloy, an iron-cobalt alloy, an iron-phosphorus alloy, an iron-nickel-cobalt alloy, and an iron-aluminum-silicon alloy (sendust alloy).

Of the above-mentioned iron-based soft magnetic powders, a pure iron powder is preferred. Particularly, a reduced iron powder or an atomized iron powder which is usually used for powder metallurgy is preferred. A reduced iron powder, which imparts good mechanical properties to the obtained magnetic core, is more preferred. A reduced iron powder is an iron powder manufactured by, for example, reduction of an iron oxide produced in a steel mill with coke or the like followed by a heat treatment in a hydrogen atmosphere. Particles of this powder include vacancies. An atomized iron powder is an iron powder manufactured by pulverizing and cooling molten steel with use of high-pressure water and then carrying out a heat treatment of the resulting product in a hydrogen atmosphere. Particles of this powder include no vacancy. On the particle surface of the reduced iron powder, many surface irregularities are seen in a photograph of cross section thereof. It is considered that these irregularities may decrease the radial crushing strength.

The surfaces of particles of the iron-based soft magnetic powder are coated with an inorganic insulator. The type of the inorganic insulating material is not particularly limited, and may be a conventional material used in the field of powder magnetic cores. Examples of preferred insulating materials include metal phosphates such as iron phosphate, manganese phosphate, zinc phosphate, calcium phosphate, and aluminum phosphate; and metal oxides such as silicon oxide, magnesium oxide, aluminum oxide, titanium oxide, and zirconium oxide. Other minerals may also be used as the insulating materials. These inorganic insulating materials may be used alone or in combination of two or more thereof. Examples of commercially available products of the inorganic insulator-coated iron-based soft magnetic powder include Somaloy, trade name, manufactured by Höganas.

Preferably, the particles of the iron-based soft magnetic powder, the surfaces thereof having been coated with an inorganic insulator, are those which pass through a sieve having a mesh opening size of 106 μm, but do not pass through a sieve having a mesh opening size of 25 μm. A preferred range is such that the particles pass through a sieve having a mesh opening size of 90 μm, but do not pass through that of 38 μm. When the particles are fine particles which can pass through an opening of 25 μm, it is difficult to form a resin coating on the surface of the iron particles. When the iron particles are those which do not pass through an opening of 106 μm, the iron loss would be increased.

The epoxy resin which can be used in the present invention is preferably an epoxy resin usable for an adhesive, having a softening point of 100° C. to 120° C. For example, it is possible to employ epoxy resins which are solid at room temperature, become pasty at 50° C. to 60° C., fluidized at 130° C. to 140° C., and enter into a curing reaction when further heated. The curing reaction may start at around 120° C.; however, the preferred temperature range which allows the reaction to be completed within a practical time of curing, such as within 2 hours, is a temperature of 170° C. to 190° C. If the curing reaction is carried out in this temperature range, the curing time is 45 to 80 minutes.

Examples of the resin component of the epoxy resin include bisphenol A-type epoxy resins, bisphenol F-type epoxy resins, bisphenol S-type epoxy resins, hydrogenated bisphenol A-type epoxy resins, hydrogenated bisphenol F-type epoxy resins, stilbene-type epoxy resins, triazine skeleton-containing epoxy resins, fluorene skeleton-containing epoxy resins, alicyclic epoxy resins, novolak-type epoxy resins, acrylic epoxy resins, glycidyl amine-type epoxy resins, triphenol phenol methane type epoxy resins, alkyl-modified triphenolmethane-type epoxy resins, biphenyl-type epoxy resins, dicyclopentadiene skeleton-containing epoxy resins, naphthalene skeleton-containing epoxy resins, and aryl alkylene type epoxy resins.

A curing component for the epoxy resin is a latent epoxy curing agent. By using the latent epoxy curing agent, the softening point of the epoxy resin can be adjusted to 100° C. to 120° C., and the curing temperature can be adjusted to 170° C. to 190° C. This makes it possible to form an organic insulating coating on the inorganic insulator-coated surfaces of the iron powder particles, which can be then subjected to compression molding and subsequent thermal curing.

Examples of the latent epoxy curing agent include dicyandiamide, a boron trifluoride-amine complex, and organic acid hydrazide. Of these agents, dicyandiamide is preferable because it can be suitably used under the curing condition as described above.

The epoxy resin may further contain a curing accelerator such as tertiary amine, imidazole or aromatic amine, in addition to the latent epoxy curing agent.

The epoxy resin containing the latent curing agent which can be used in the present invention is one in which the latent curing agent is contained so that the epoxy resin can be cured in 2 hours at 160° C., in 80 minutes at 170° C., in 55 minutes at 180° C., in 45 minutes at 190° C., or in 30 minutes at 200° C.

The amounts of the iron-based soft magnetic powder in which the inorganic insulating coating has been formed on the particle surfaces and the epoxy resin are such that the iron-based soft magnetic powder is contained in an amount of 95 to 99% by mass, and the epoxy resin containing the latent curing agent is contained in an amount of 1 to 5% by mass, based on the total amount of the powder and resin. This is because the epoxy resin of less than 1% by mass makes it difficult to form the insulating coating, whereas that of more than 5% by mass would deteriorate the magnetic properties of the obtained magnetic core, and generate coarse aggregates rich in the resin.

In producing the magnetic core of the present invention, the iron-based soft magnetic powder in which the inorganic insulating coating has been formed on the particle surfaces and the epoxy resin are subjected to a dry blending treatment at a temperature of 100° C. to 120° C. to form an uncured resin coating on the inorganic insulating coating that has been formed on the particle surfaces of the iron-based soft magnetic powder. This uncured resin coating is also an insulating coating. After the thermal curing treatment, there is obtained a composite insulating coating including the inorganic insulating coating and the resin coating. The composite insulating coating has significantly improved insulating properties. Thus, the magnetic core provided with this coating can be utilized in the field where electrical insulating properties are expected.

The iron-based soft magnetic powder having the insulating coating formed on the particle surfaces is compression molded into a molded body by using a mold. Subsequently, the molded body is thermally cured at a temperature equal to or greater than the thermal curing initiation temperature of the epoxy resin to obtain the magnetic core in which the iron-based soft magnetic powder has been integrated with the epoxy resin.

The magnetic core of the present invention has excellent electrical insulating properties as well as excellent magnetic properties, radial crushing strength and other mechanical properties. The molded magnetic core is excellent in cutting workability. This makes it possible to produce thin or specially shaped articles of the magnetic core in an easy manner. Accordingly, the magnetic core of the present invention can be utilized in a situation where, for example, an outer joint member of a constant velocity universal joint is to be hardened.

Figure 4:
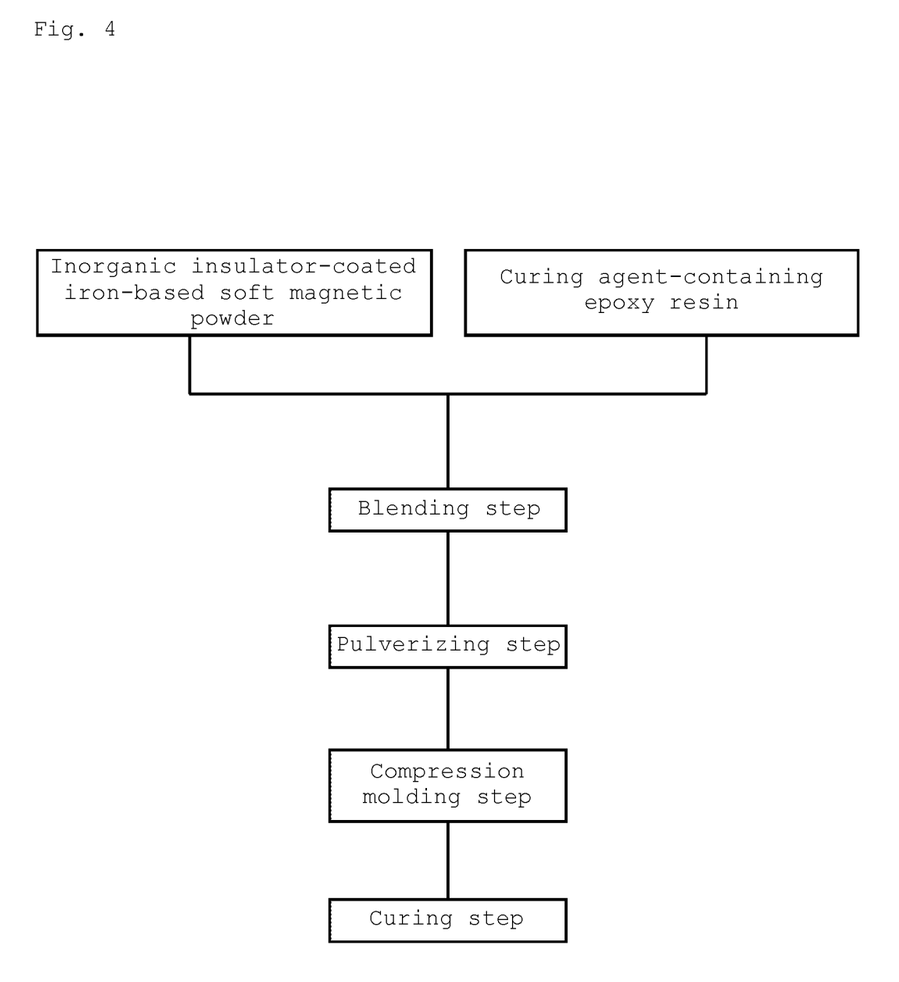
FIG. 4 is a flow diagram.

The method for manufacturing the magnetic core is described below with reference to FIG. 4. FIG. 4 shows a flow diagram.

The iron-based soft magnetic powder having the inorganic insulating coating formed on the particle surfaces and the epoxy resin to which the latent curing agent has been added are prepared. The particles of the iron-based soft magnetic powder are screened in advance using a classifier so that the particles pass through a sieve having a mesh opening size of 106 μm, but do not pass through a sieve having a mesh opening size of 25 μm.

In the blending step, the inorganic insulator-coated iron-based soft magnetic powder and the epoxy resin are dry blended at a temperature equal to or greater than the softening point of the epoxy resin and lower than the thermal curing initiation temperature of the resin. At the beginning of the blending step, the inorganic insulator-coated iron-based soft magnetic powder is sufficiently mixed with the epoxy resin at room temperature by using a blender or the like. Subsequently, the resulting mixture is fed into a blending machine such as a kneader and then hot blended at the softening point of the epoxy resin (100° C. to 120° C.). By this hot blending operation, the insulating coating of the epoxy resin is formed on the inorganic insulator-coated surfaces of the iron-based soft magnetic powder particles. In this step, the epoxy resin is not cured yet.

The hot blended material in the blending machine such as a kneader becomes an agglomerated cake-like mass. In the pulverizing step, this agglomerated cake is pulverized at room temperature and sieved to obtain the composite magnetic powder having the insulating coating of the epoxy resin formed on the particle surfaces. Preferably, a Henschel mixer is used for the pulverizing operation. It is preferred to prepare the particles that pass through a 60-mesh (250 μm) sieve by the sieving.

The mold used in the compression molding step may be a mold which can apply a molding pressure of 98 to 294 MPa. When the molding pressure is less than 98 MPa, the resulting product has poor magnetic properties and poor strength. When the molding pressure is more than 294 MPa, the epoxy resin tightly adheres to the inner wall of the mold, and the resin coatings would be destroyed, thereby decreasing the insulating properties of the magnetic core.

The molded body taken out of the mold is thermally cured at 170° C. to 190° C. for 45 to 80 minutes. The curing of the molded body requires a prolonged time at below 170° C., whereas the molded body begins to be degraded at above 190° C. The thermal curing is preferably carried out in a nitrogen atmosphere.

After the molded body is thermally cured, the resultant product may be subjected to cutting operation, barrel finishing or rustproofing as needed to obtain the magnetic core.

EXAMPLES

Example 1

A blender was charged with 97.0 g of iron powder particles having an inorganic insulating coating on particle surfaces thereof and 3.0 g of an epoxy resin powder containing dicyandiamide as a curing agent, and these materials were mixed at room temperature for 10 minutes in the blender. The iron powder particles used were those which pass through a sieve having a mesh opening size of 106 μm, but do not pass through a sieve having a mesh opening size of 25 μm. The resultant mixture was fed into a kneader and was kneaded while being heated at 110° C. for 15 minutes to obtain an agglomerated cake. The cake removed from the kneader was cooled and then pulverized by using a pulverizer. Subsequently, the pulverized product was compression molded under a molding pressure of 200 MPa by using a mold. The compression molded body was removed from the mold, and then cured at 180° C. for 1 hour in a nitrogen atmosphere. A cutting operation was performed on the cured body to produce a magnetic core.

A toroidal sample of the magnetic core for magnetic property measurement was prepared in the manner as described above to determine the magnetic properties. The toroidal test sample was a flat cylindrical piece of the magnetic core having an inner diameter of 7.6 mmϕ, an outer diameter of 12.6 mmϕ and a thickness of 5.7 mm which was provided with a primary winding and a secondary winding. A direct current was allowed to pass through the primary winding to vary the magnetizing force (A/m), and the magnetic flux density of the secondary winding was measured with the varied magnetizing force, thereby to determine the saturation magnetic flux density. The number of turns of winding on the magnetic core was adjusted to give an inductance of 10 μH. Then, the inductance at a frequency of 1 kHz was considered as 100% to determine the inductance at a different frequency and the relative permeability. The iron loss and the temperature characteristics (the rate of change of the inductance) were determined by using the above-mentioned magnetic core under the conditions shown in Table 1. In addition, the radial crushing strength of the magnetic core was measured. To determine the radial crushing strength, a continuous load was diametrically applied to the magnetic core until the core was broken so as to measure the load applied when the core was broken. The measurement results are shown in Table 1.

Further, a sample of the magnetic core of 10 mm×25 mm×3 mm (thickness) was prepared for measuring the surface hardness, volume resistivity, surface resistivity and density of the core. The surface hardness was determined by a Rockwell hardness test method, the volume and surface resistivities by a four-point probe method, and the density by an in-water method. The measurement results are shown in Table 1.

Comparative Example 1

A magnetic core was produced in the same manner as in Example 1 using similar iron powder particles as in Example 1 except that the powder particles were those without inorganic insulating coating on the particle surfaces. The properties of the magnetic core were evaluated in the same manner as described in Example 1. The results are shown in Table 1.

Comparative Example 2

The iron powder particles having an inorganic insulating coating on particle surfaces thereof as used in Example 1 were compression molded under a molding pressure of 900 MPa by using a mold. The compression molded body was removed from the mold and then subjected to a heat treatment at a temperature of 530° C. for 20 minutes in an air atmosphere. A cutting operation was performed on the resultant product to produce a magnetic core. The properties of the magnetic core were evaluated in the same manner as described in Example 1. The results are shown in Table 1.

Comparative Examples 3 and 4

A magnetic core made by consolidating an iron powder with polytetrafluoroethylene (Comparative Example 3) and a magnetic core made by consolidating a sendust powder with a phenol resin (Comparative Example 4) were each formed into pieces having the same shape as that of the above-mentioned sample. The properties of these magnetic cores were evaluated in the same manner as described in Example 1. In the cutting operation, the magnetic cores of Comparative Examples 3 and 4 were broken or cracked upon cutting of their thin sections because of their poor mechanical strength. The results are shown in Table 1.

TABLE 1

|  |  | Example 1 | Comparative Example 1 | Comparative Example 2 | Comparative Example 3 | Comparative Example 4 |
|---|---|---|---|---|---|---|
| Saturation magnetic flux density, mT | | ≈800 | ≈1300 | ≈1600 | ≈1200 | ≈500 |
| Frequency characteristics Rate of change of inductance (%) | 1 KHz | 100 | 100 | 100 | 100 | 100 |
| | 1000 KHz | 96.8 | 90.3 | 62.4 | 89.7 | 99.1 |
| Relative permeability (μs) | 1 KHz | 30 | 54 | 90 | 40 | 21 |
| Iron loss (KW/m$^3$) | 10 KHz/200 mT | 1250 | 1490 | 2090 | 1690 | 1120 |
| | 50 KHz/100 mT | 2060 | 2270 | 3430 | 2760 | 2070 |
| Temperature characteristics Rate of change of inductance (%) | 25° C. | 100 | 100 | 100 | 100 | 100 |
| | 130° C. | 108.7 | 103.8 | 107.5 | 109.1 | 114.3 |
| Radial crushing strength (MPa) | | 100 | 150 | 60 | 30 | 50 |
| Hardness (HRH) | | 72.5 | 82.5 | 101 | 74 | 99.5 |
| Volume resistivity (Ω·cm) | | 1.00E+05 | 2.00E−01 | 1.00E−02 | 1.00E+00 | 2.60E+05 |
| Surface resistivity (Ω/□) | | 1.00E+05 | 7.10E−01 | 1.00E−02 | 1.00E+01 | 7.90E+05 |
| Density (g/cm$^3$) | | 5.3 | 6.1 | 7.2 | 6.4 | 4.6 |

The magnetic core of Example 1 had electrical insulating properties improved by a factor of $10^5$ or more as compared to those of Comparative Examples 1 or 2.

INDUSTRIAL APPLICABILITY

The magnetic core of the present invention exhibits high economic efficiency, good magnetic properties and high material strength as well as excellent electrical properties such as good volume resistivity and surface resistivity, and therefore can be utilized as a general-purpose magnetic core. Especially, this magnetic core can be very effectively used in the case where the magnetic core is fitted in the frame of a circular or rectangular coil. The core can also be utilized as a soft magnetic core to be used in a situation where the use of an intricately shaped core is required, such as those to be mounted at a heating coil portion of an induction hardening apparatus.

EXPLANATION OF REFERENCE NUMERALS AND SYMBOLS

1 Magnetic core
2 Coil
3 Current
4 Particle of composite magnetic powder

The invention claimed is:

1. A magnetic core manufactured by compression molding and subsequent thermal curing of an iron-based soft magnetic powder having a resin coating formed on particle surfaces thereof, wherein:
    said magnetic core is adapted for use with an induction hardening coil, said induction hardening coil is circular or rectangular, and in use, said magnetic core is fitted into a circular or rectangular frame;
    said iron-based soft magnetic powder having a resin coating formed on particle surfaces thereof in which said particle surfaces have been coated with an inorganic insulator, where said inorganic insulator is located between said iron-based soft magnetic powder and said resin coating, to form iron-based soft magnetic powder inorganic insulator coated particles;
    said inorganic insulator coated particles being sized to pass through a sieve having a mesh opening size of 106 μm, but not to pass through a sieve having a mesh opening size of 25 μm;
    the resin coating is an uncured resin coating formed by dry blending the iron-based soft magnetic powder, with a thermosetting epoxy resin containing a latent curing agent wherein said epoxy resin containing the latent curing agent has a softening point of 100° C. to 120° C., at a temperature equal to or greater than said softening point of the thermosetting resin and lower than the thermal curing initiation temperature of the resin;
    the compression molding is carried out by using a mold to produce a compression molded body; and
    the thermal curing is carried out at a temperature equal to or greater than the thermal curing initiation temperature of the thermosetting resin.

2. The magnetic core according to claim 1, wherein the latent curing agent is dicyandiamide.

3. The magnetic core according to claim 1, wherein the iron-based soft magnetic powder is contained in an amount of 95 to 99% by mass, and the epoxy resin containing the latent curing agent is contained in an amount of 1 to 5% by mass, based on the total amount of the iron-based soft magnetic powder and the epoxy resin containing the latent curing agent.

4. A method for manufacturing the magnetic core according to claim 1, the method including: a blending step of dry blending the iron-based soft magnetic powder, the particle surfaces thereof having been coated with an inorganic insulator, with the epoxy resin containing the latent curing agent, at a temperature equal to or greater than the softening point of the epoxy resin and lower than the thermal curing initiation temperature of the resin; a pulverizing step of pulverizing an agglomerated cake produced in the blending step, at room temperature, to obtain a composite magnetic powder; a compression molding step of molding the composite magnetic powder into a compression molded body by using a mold; and a curing step of thermally curing the compression molded body at a temperature equal to or greater than the thermal curing initiation temperature of the epoxy resin.

5. The method according to claim 4, wherein the compression molding step is carried out under a molding pressure of 98 to 294 MPa.

6. The method according to claim 4, wherein the curing step is carried out at a curing temperature of 170° C. to 190° C. in an inert gas atmosphere.

* * * * *